United States Patent
Kasperowski et al.

(10) Patent No.: US 8,052,197 B2
(45) Date of Patent: Nov. 8, 2011

(54) CABRIOLET VEHICLE

(75) Inventors: Bernd Kasperowski, Schwieberdingen (DE); Wolfgang Ramin, Vaihingen (DE); Grant Larson, Ludwigsburg (DE); Stefan Eichholz, Wurmberg (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/844,464

(22) Filed: Jul. 27, 2010

(65) Prior Publication Data

US 2011/0025093 A1  Feb. 3, 2011

(30) Foreign Application Priority Data

Jul. 28, 2009  (DE) .......... 10 2009 035 030

(51) Int. Cl.
*B62D 25/06* (2006.01)
(52) U.S. Cl. .......... 296/107.17; 296/102; 296/107.16
(58) Field of Classification Search .......... 296/102, 296/103, 107.01, 107.16, 107.17
See application file for complete search history.

(56) References Cited

U.S. PATENT DOCUMENTS 6,168,224 B1   1/2001  Henn et al.
2011/0025088 A1*  2/2011  Baumgart et al. ............ 296/109

FOREIGN PATENT DOCUMENTS

| DE | 10015061 A1 | 6/2001 |
| DE | 202004015262 U1 | 11/2004 |
| DE | 20 2006 012 235 | 12/2006 |
| DE | 102007045780 A1 | 4/2009 |
| EP | 0836960 A1 | 4/1998 |

* cited by examiner

*Primary Examiner* — Lori Lyjak
(74) *Attorney, Agent, or Firm* — Gerald E. Hespos; Michael J. Porco

(57) ABSTRACT

A cabriolet vehicle has a body structure and a roof structure that can be attached to the body structure (14). The roof structure has a top with a top material. The top material has a main section, which forms the actual roof of the roof structure in the closed state of the top and lateral rear elongation sections. The elongation sections can be threaded into openings (15) of the body structure (14) and attached to tensioning brackets (19) of the body structure.

7 Claims, 3 Drawing Sheets

CABRIOLET VEHICLE

CROSS-REFERENCE TO RELATED APPLICATIONS

This application claims priority under 35 USC 119 to German Patent Application No. 10 2009 035 030.6 filed on Jul. 28, 2009, the entire disclosure of which is incorporated herein by reference.

BACKGROUND OF THE INVENTION

1. Field of the Invention

The invention relates to a roof structure for a cabriolet vehicle.

2. Description of the Related Art

DE 20 2006 012 235 U1 discloses a cabriolet vehicle having a body structure and a roof structure. The roof structure has a top with a top material that is guided in sections by a double hoop in the closed state of the top. The double hoop has two substantially U-shaped hoops that extend transversely with respect to the longitudinal direction of the cabriolet vehicle. The top material of the top has a main section and lateral rear elongation sections. The main section forms the actual roof of the roof structure in the closed state of the top.

The object of the invention is to create a novel cabriolet vehicle in which the roof structure can be attached in a simple and secure manner to the body structure.

SUMMARY OF THE INVENTION

The invention relates to a roof structure for a cabriolet vehicle. The cabriolet vehicle has a body structure and the roof structure can be attached to the body structure. The roof structure has a top with a top material. The top material of the top has a main section and two lateral rear elongation sections. The elongation sections can be passed into openings of the body structure and attached to the body structure. The body structure includes a tensioning device with tensioning brackets that enable a simple and secure attachment of the roof structure to the body structure of the cabriolet vehicle.

Exemplary embodiments of the invention will be explained on the basis of the drawing, without the invention being restricted to these exemplary embodiments.

DETAILED DESCRIPTION OF THE PREFERRED EMBODIMENT

Figure 1:
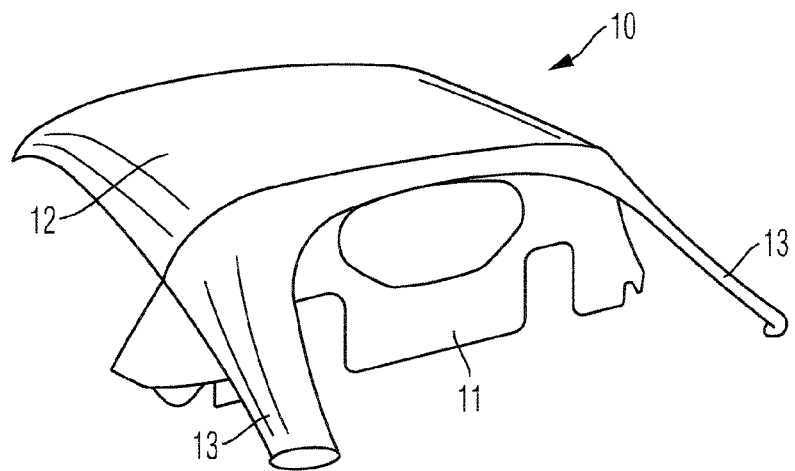
FIG. 1 is a schematic perspective view of a top of a roof structure for a cabriolet vehicle together with a weather partition for the cabriolet vehicle.
Figure 2:
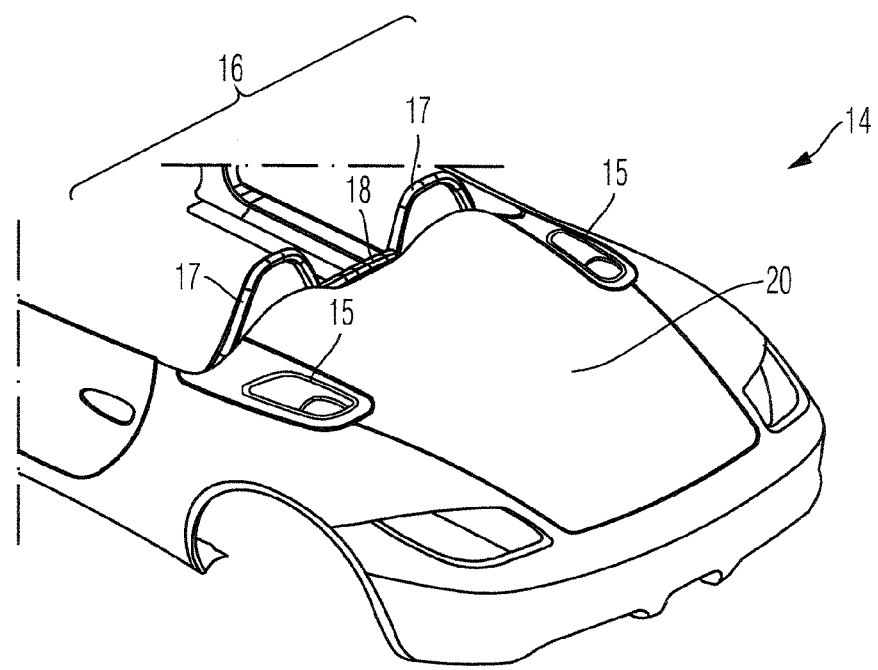
FIG. 2 is a schematic perspective view of a body structure of a cabriolet vehicle together with a rollover hoop that is part of the roof structure.
Figure 3:
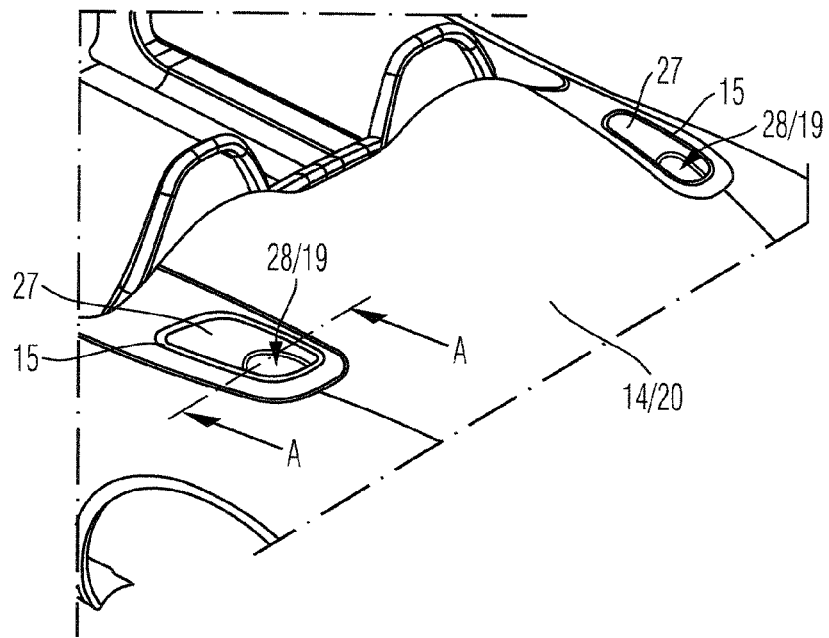
FIG. 3 shows an enlarged detail of FIG. 2.

A cabriolet vehicle in accordance with the invention has a roof structure, as shown in FIG. 1, and a body structure, as shown in FIG. 2. The roof structure of the cabriolet vehicle has a top 10, as shown in FIG. 1, and a weather partition 11 defined as a rear window. The top 10 has a top material with a main section 12 that forms the actual roof of the cabriolet vehicle in the closed state of the top 10. Lateral rear elongation sections 13 of the main section 12 enable the top 10 to be threaded into openings 15 in the body structure 14 of the cabriolet vehicle.

FIG. 2 shows the body structure 14 with a rollover hoop 16 that has two U-shaped hoop parts 17 that engage on a cross bar 18. The rollover hoop 16 partially guides a rear part of the main section 12 of the top 10 in the closed state, and hence may be considered part of the roof structure.

The lateral rear elongation sections 13 of the top material of the top 10 enable the top 10 to be inserted into the openings 15 of the body structure 14. The lateral rear elongation sections 13 of the top material that have been threaded into the openings 15 of the body structure 14 can be attached to tensioning brackets 19 of a tensioning device of the body structure 14. The tensioning brackets 19 may be spring biased members that resiliently engage the respective elongation sections 13.

The openings 15 into which the elongation sections 13 of the top 10 are to be threaded or passed are part a rear lid 20 of the body structure 14.

Figure 5:
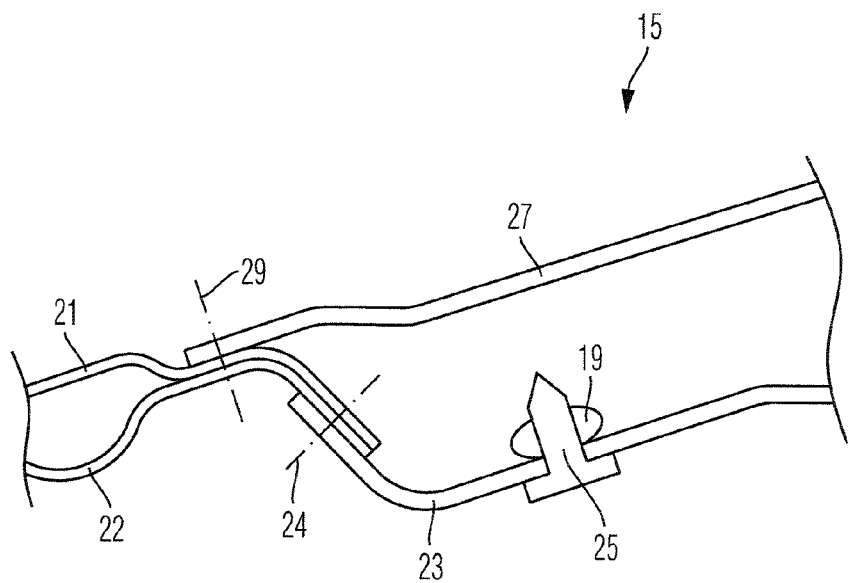
FIG. 5 shows a cross section through the details of FIGS. 3 and 4 in the section direction A-A in FIGS. 3 and 4.

The rear lid 20 has outer and inner panels 21 and 22, as shown in the cross section of FIG. 5. Recesses are formed into both the rear lid outer and inner panels 21 and 22 to delimit the openings 15.

The elongation sections 13 of the top 10 can be threaded, respectively, into the openings 15 of the body structure 14 and each opening has a tensioning bracket holding device 23. The tensioning bracket holding devices 23 are assigned to the respective openings 15 to delimit the respective openings 15 of the body structure 14 or of the rear lid 20 in the downward or inward direction, as shown in FIG. 5. The tensioning bracket holding device 23 assigned to each opening 15 is connected to both the rear lid outer panel 21 and the rear lid inner panel 22 by punch rivet connections or other connecting devices 24, as illustrated schematically in FIG. 5.

Figure 4:
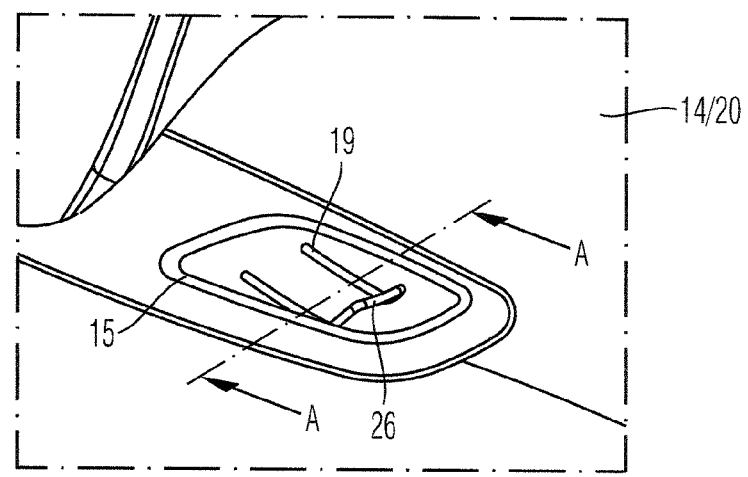
FIG. 4 shows an enlarged detail of FIG. 3.

A connecting device 25 connects the tensioning bracket 19 to the tensioning bracket holding device 23 of the respective opening 15 of the body structure 14 into which the elongation sections 13 of the top 10 are to be threaded. A lateral rear elongation section 13 of the top material can be attached to an upwardly bent rear edge 26 of the tensioning bracket 19 after the respective elongation section 13 has been threaded into the respective opening 15 of the rear lid 20, as shown in FIG. 4.

Figure 6:
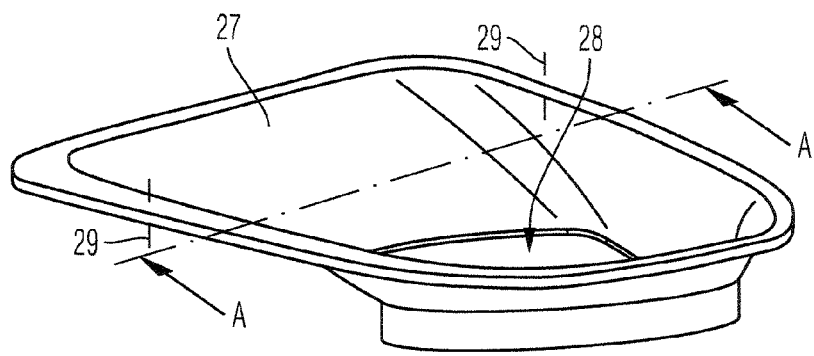
FIG. 6 shows a further detail of the invention.

FIG. 6 shows a funnel-shaped covering device 27 that is inserted into each opening 15 from above. The funnel-shaped covering device 27 that has been inserted into the respective opening 15 delimits the respective opening 15 in the upward or outward direction and has a recess 28. Each tensioning bracket 19 is in the region of the respective opening 15 and is accessible via the recess 28 of the funnel-shaped covering device 27. Thus, the respective lateral elongation section 13 of the top 10 can be threaded or passed through the recess 28 of the funnel-shaped covering device 27 and into the respective opening 15 for attachment or coupling to the respective tensioning bracket 19.

The funnel-shaped covering device 27 is connected both to the rear lid outer panel 21 and to the rear lid inner panel 22 by punch rivets or other connecting devices 29, as illustrated schematically in FIGS. 5 and 6.

Three assemblies interact in the region of each opening 15 formed into the rear lid 20 of the body structure 14, namely, the tensioning bracket 19, the tensioning bracket holding device 23 and the funnel-shaped covering device 27, and in each case one elongation section 13 of the top 10 can be threaded into each of these interacting assemblies. The tensioning bracket holding device 23 and the funnel-shaped covering device 27 are assigned to each opening 15 and are connected to the rear lid inner panel 22 and to the rear lid outer panel 21 in the region of each opening 15. The tensioning bracket holding device 23 delimits the respective opening 15 in the downward or inward direction and the covering device 27 delimits the respective opening 15 in the upward or outward direction. A recess 28 is formed into the funnel-shaped covering device 27 of each opening 15, and a lateral elongation section 13 of the top 10 or of the top material can be threaded into the respective opening 15 via the recess 28 to be attached or coupled in the region of the opening 15 to the tensioning bracket 19 that is connected to the respective tensioning bracket holding device 23.

The invention permits a simple and secure attachment of the roof structure of the cabriolet vehicle to the body structure, specifically by means of the lateral elongation sections 13 of the top material of the top 10, which are threaded into the openings 15 and attached to tensioning brackets 19 positioned in the region of the openings 15.

What is claimed is:

1. A cabriolet vehicle, comprising:
a body structure formed with openings, tensioning brackets provided on the body structure at the openings; and
a roof structure having a top with a top material, the top material having a main section and lateral rear elongation sections threaded into openings of the body structure and attached the body structure at the respective tensioning brackets.

2. A cabriolet vehicle, comprising:
a body structure formed with openings, tensioning brackets provided on the body structure at the openings; and
a roof structure having a top with a top material, the top material having a main section and lateral rear elongation sections threaded into openings of the body structure and attached the body structure at the respective tensioning brackets; and
wherein the body structure has a rear lid with outer and inner rear lid panels, tensioning bracket holding devices being mounted to the outer and inner rear lid panels in proximity to the respective opening, and the tensioning brackets being fastened to the respective tensioning bracket holding devices, the elongation sections of the top material being threaded into the openings in the outer and inner rear lid panels and fastened to the tensioning brackets.

3. The cabriolet vehicle of claim 2, wherein the tensioning bracket holding devices delimit the respective openings of the body structure in a downward or inward direction.

4. The cabriolet vehicle of claim 3, further comprising funnel-shaped covers inserted into the respective openings of the body structure, the covers delimiting the respective opening in an upward or outward direction and having a recess for receiving the corresponding elongation section of the top material threaded into the respective opening.

5. A cabriolet vehicle, comprising:
a body structure formed with a rear lid, left and right openings formed through the rear lid, tensioning bracket holding devices mounted to the rear lid and defining inner limits of the respective openings, tensioning brackets fastened to the respective tensioning bracket holding devices and projecting into the respective openings; and
a roof structure having a top with a top material, the top material having a main section and left and right lateral rear elongation sections threaded into openings of the body structure and attached to the respective tensioning brackets.

6. The cabriolet vehicle of claim 5, wherein the rear lid has outer and inner rear lid panels nested with one another at the left and right openings, the tensioning bracket holding devices being connected to nested portions of the outer and inner rear lid panels.

7. The cabriolet vehicle of claim 6, further comprising left and right funnel-shaped covers inserted into the respective left and right openings of the body structure, the covers delimiting the respective openings at positions upward of the respective tensioning bracket holding devices, each funnel-shaped cover having a recess surrounding the respective tensioning device and enabling attachment of the corresponding elongation section of the top material to the respective tensioning bracket.

* * * * *